Figure 1:
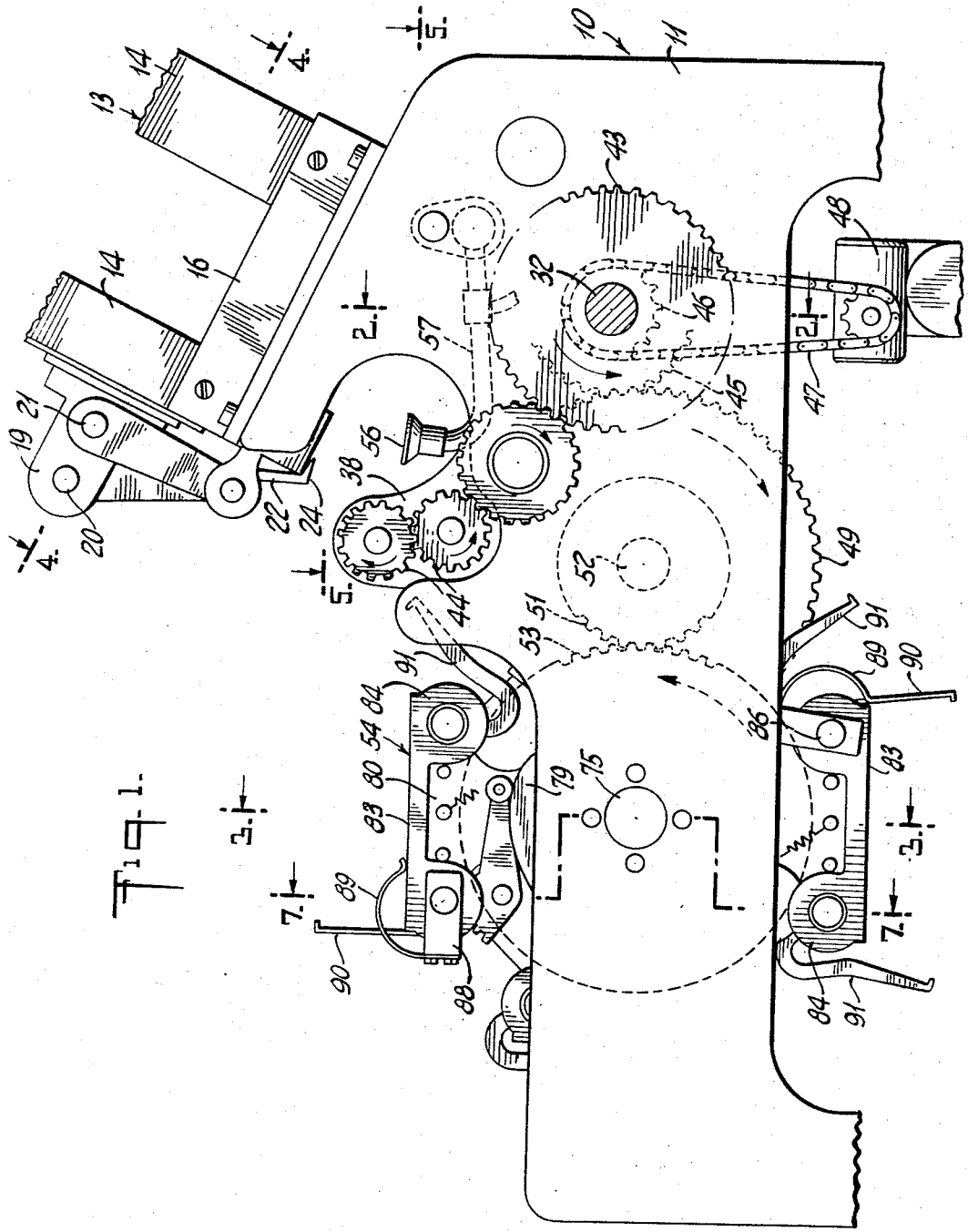

April 25, 1967  A. A. PINTO  3,315,575
CARTON ERECTING AND FEEDING
Filed April 14, 1964  13 Sheets-Sheet 1

INVENTOR.
ALBERT A. PINTO
BY
PATENT AG'T.

April 25, 1967   A. A. PINTO   3,315,575
CARTON ERECTING AND FEEDING
Filed April 14, 1964   13 Sheets-Sheet 3

INVENTOR
ALBERT A. PINTO
BY
PATENT AG'T.

April 25, 1967 A. A. PINTO 3,315,575
CARTON ERECTING AND FEEDING
Filed April 14, 1964 13 Sheets-Sheet 4

INVENTOR.
ALBERT A. PINTO
BY
PATENT AG'T.

April 25, 1967  A. A. PINTO  3,315,575
CARTON ERECTING AND FEEDING
Filed April 14, 1964  13 Sheets-Sheet 6

INVENTOR.
ALBERT A. PINTO
BY
PATENT AG'T.

April 25, 1967

A. A. PINTO 3,315,575

CARTON ERECTING AND FEEDING

Filed April 14, 1964

13 Sheets-Sheet 7

INVENTOR.
ALBERT A. PINTO

BY

PATENT AG'T.

April 25, 1967  A. A. PINTO  3,315,575
CARTON ERECTING AND FEEDING
Filed April 14, 1964  13 Sheets-Sheet 9

INVENTOR
ALBERT A. PINTO
BY
PATENT AG'T.

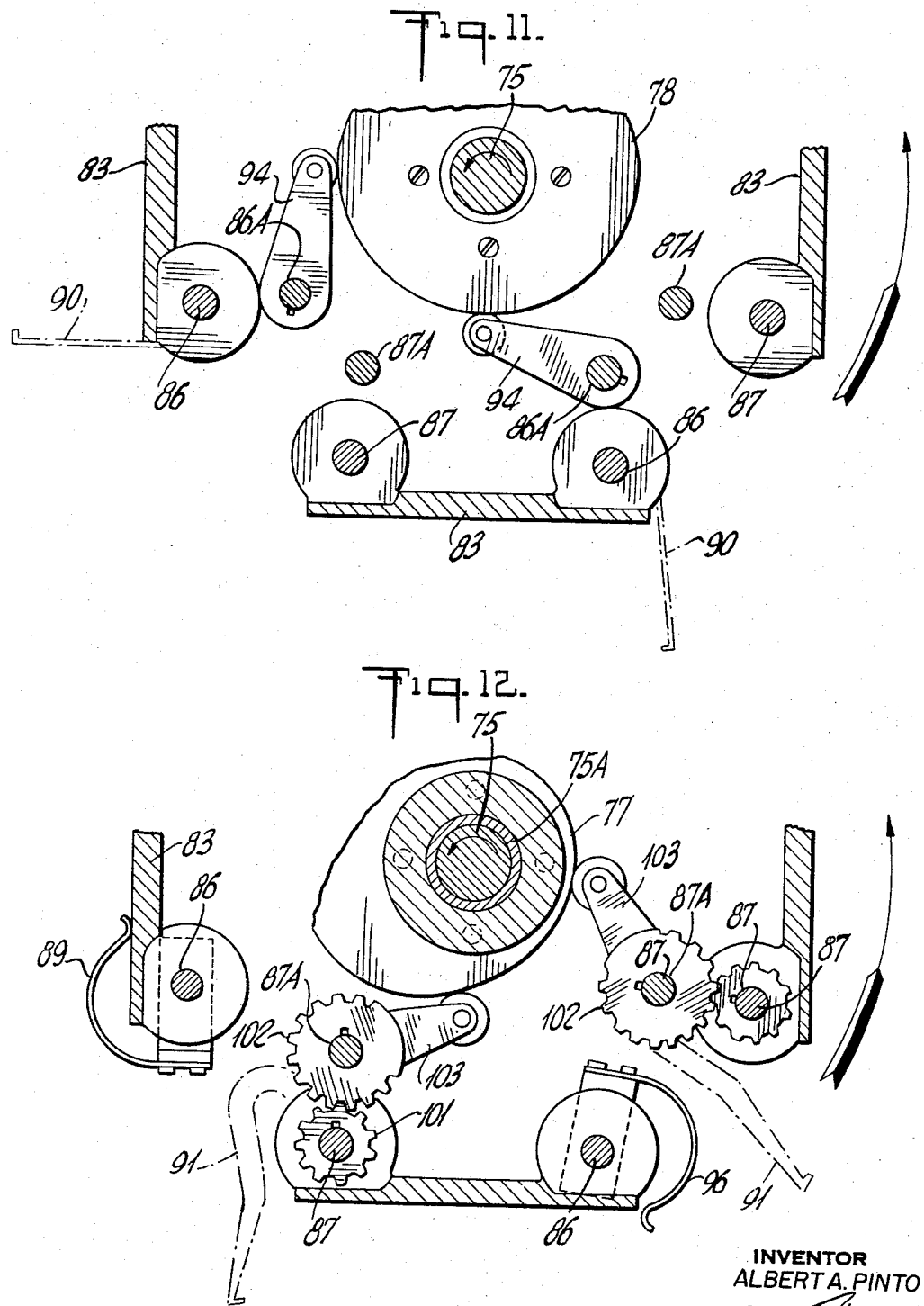

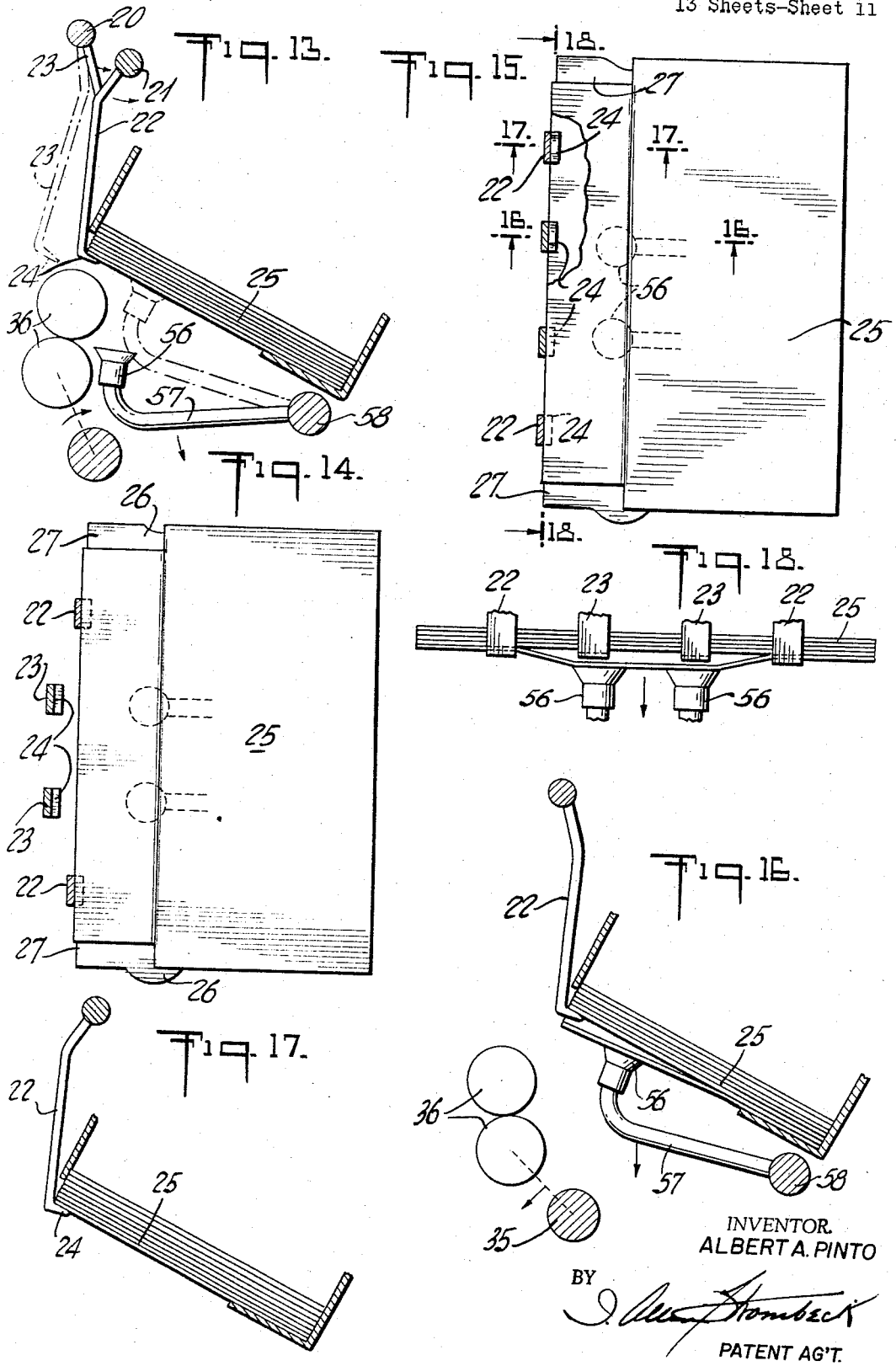

April 25, 1967 A. A. PINTO 3,315,575
CARTON ERECTING AND FEEDING
Filed April 14, 1964 13 Sheets-Sheet 12
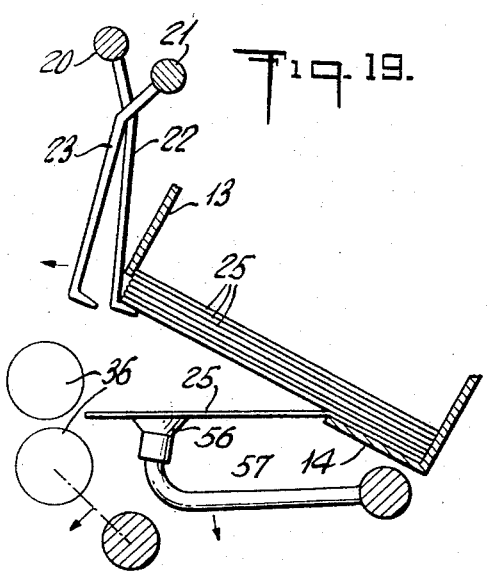
Fig. 19.
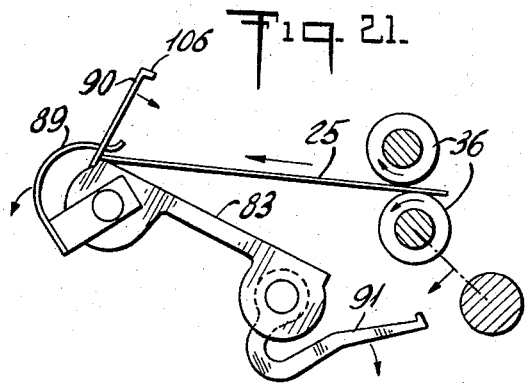
Fig. 21.
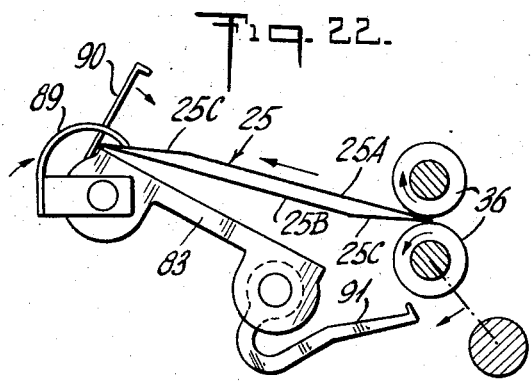
Fig. 22.
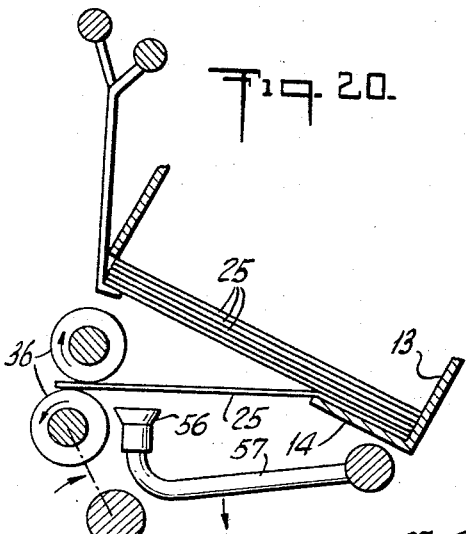
Fig. 20.
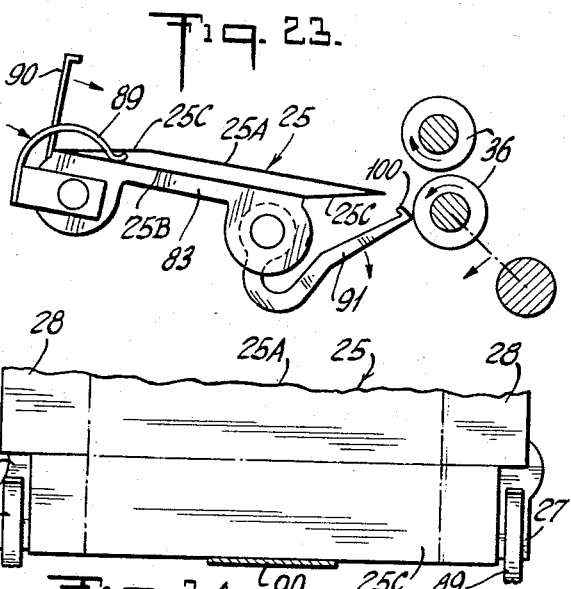
Fig. 23.
Fig. 24.
INVENTOR
ALBERT A. PINTO
BY
PATENT AG'T.

April 25, 1967 A. A. PINTO 3,315,575
CARTON ERECTING AND FEEDING
Filed April 14, 1964 13 Sheets-Sheet 13
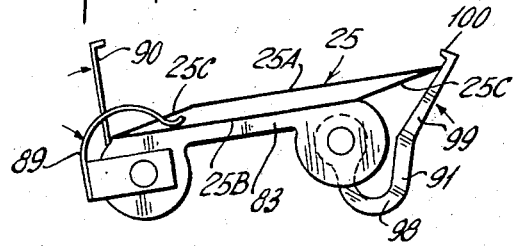
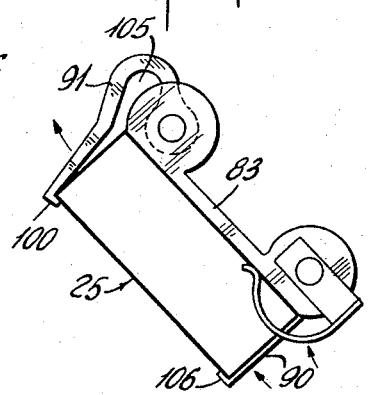
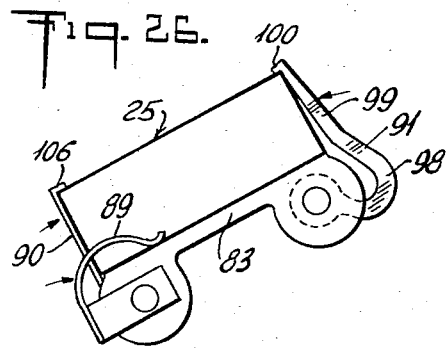
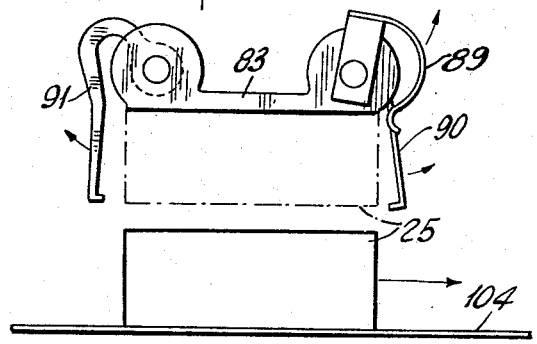
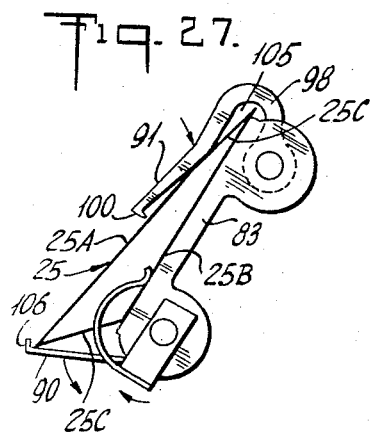
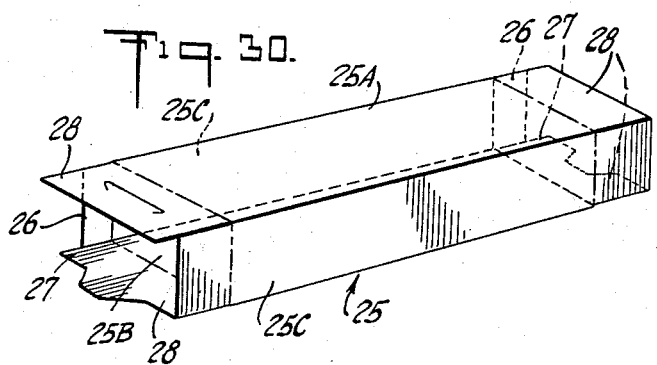
INVENTOR
ALBERT A. PINTO
BY
PATENT AG'T.

United States Patent Office 3,315,575
Patented Apr. 25, 1967

3,315,575
CARTON ERECTING AND FEEDING
Albert A. Pinto, White Plains, N.Y., assignor to National Biscuit Company, a corporation of New Jersey
Filed Apr. 14, 1964, Ser. No. 359,697
14 Claims. (Cl. 93—53)

This invention relates generally to carton erecting and feeding means and in particular to a machine in which carton blanks may be fed and erected at high speed.

An object of the invention is to erect a preformed flat carton so that it is ready for loading and to erect the carton during its feeding operation from a magazine to a conveyor upon which it is deposited by the erecting mechanism.

A still further object of the invention is to provide novel means for simultaneously shaping into rectangular form, preformed cartons fed to the machine in flat stacked arrangement.

Other objects include the provision of means for opening or setting up for loading, precut folded flat carton blanks in which the carton erecting means is of rotary carton carrying form, thus eliminating the need for using a chain conveyor which would increase the space necessary in a plant or bakery and which, due to the wear in the chain parts, varies the timing of the operating parts and alters the synchronous operation thereof; to provide rotary carrier means for feeding the cartons from a magazine and at the same time erect the cartons and discharge them simultaneously and continuously to a conveyor; to provide an erecting mechanism in which the cartons do not travel alone but are carried by a rotary carrier member so that wear and tear on the cartons, due to movement thereof during the erecting operation, is largely eliminated, and to provide a novel method and means for opening a flat folded carton without the need for special operating parts.

Figure 2:
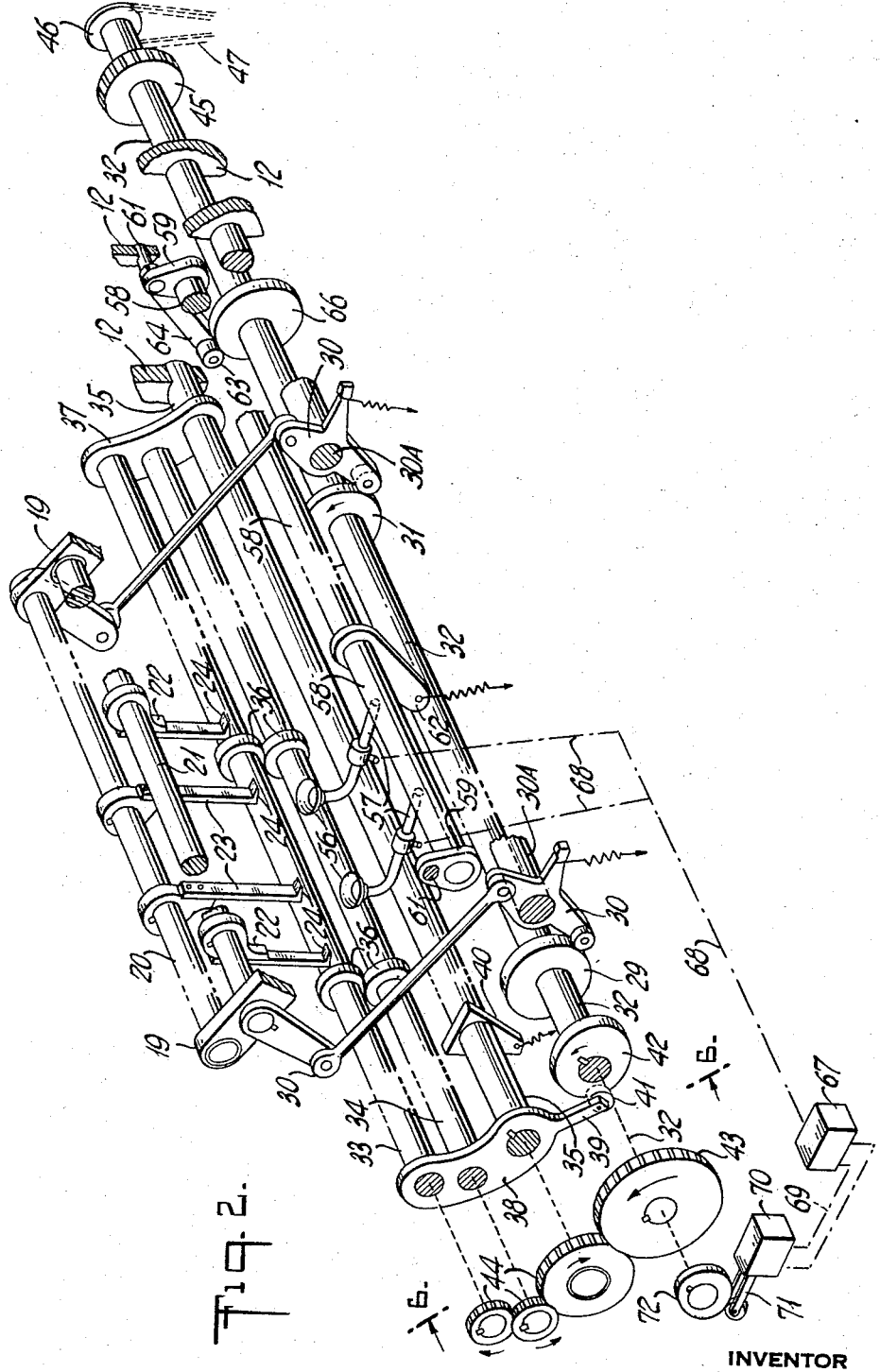
Figure 3:
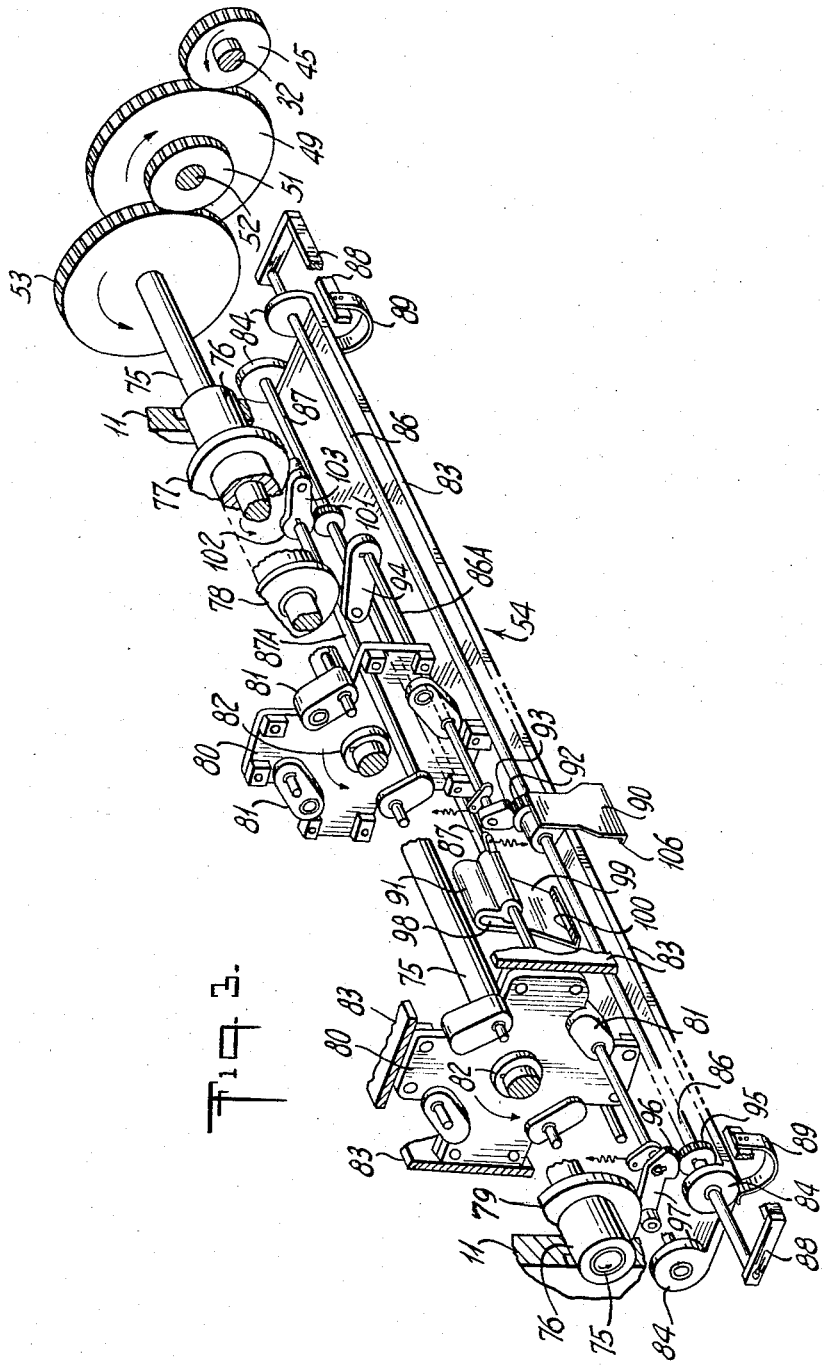
Figure 4:
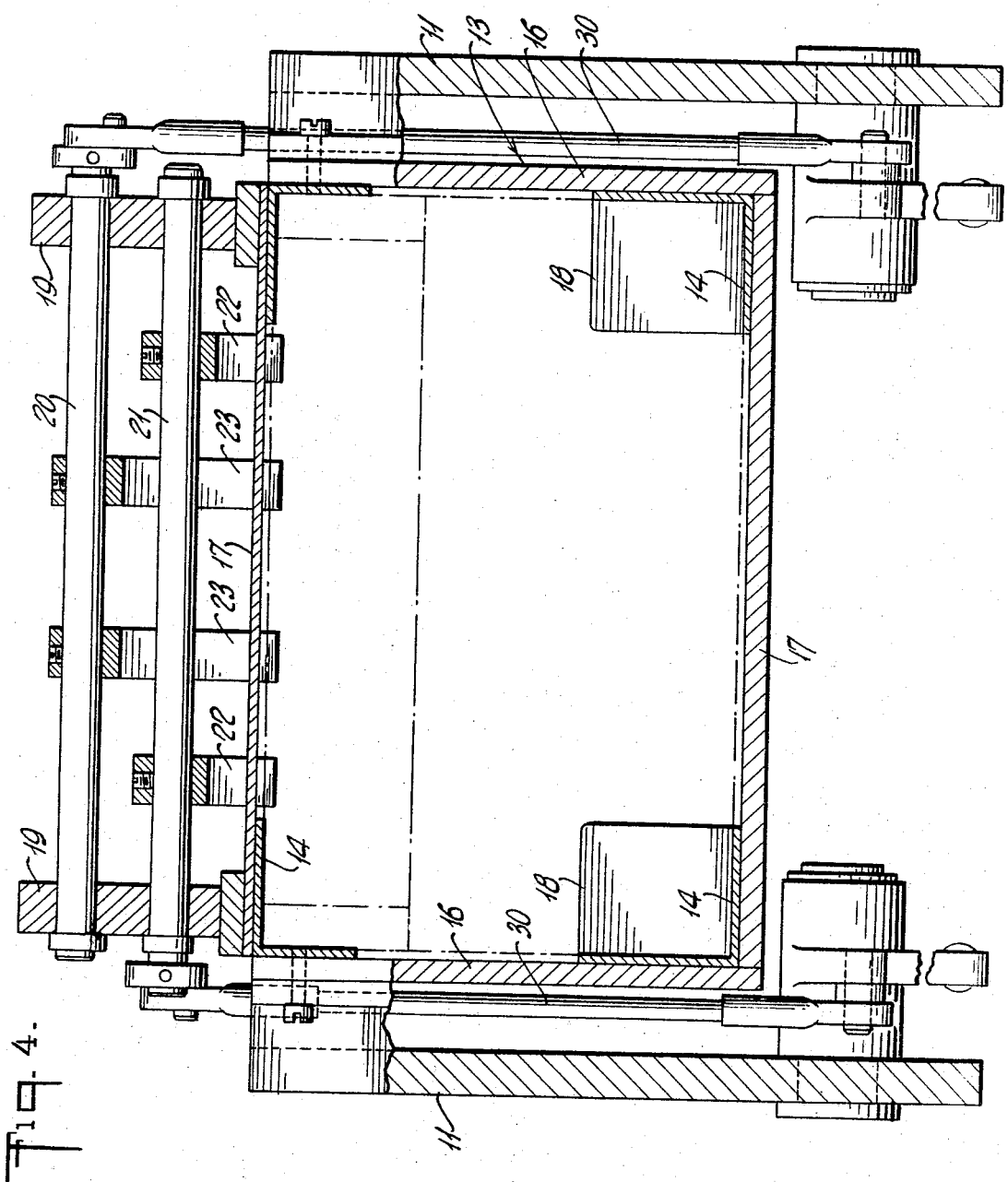
Figure 5:
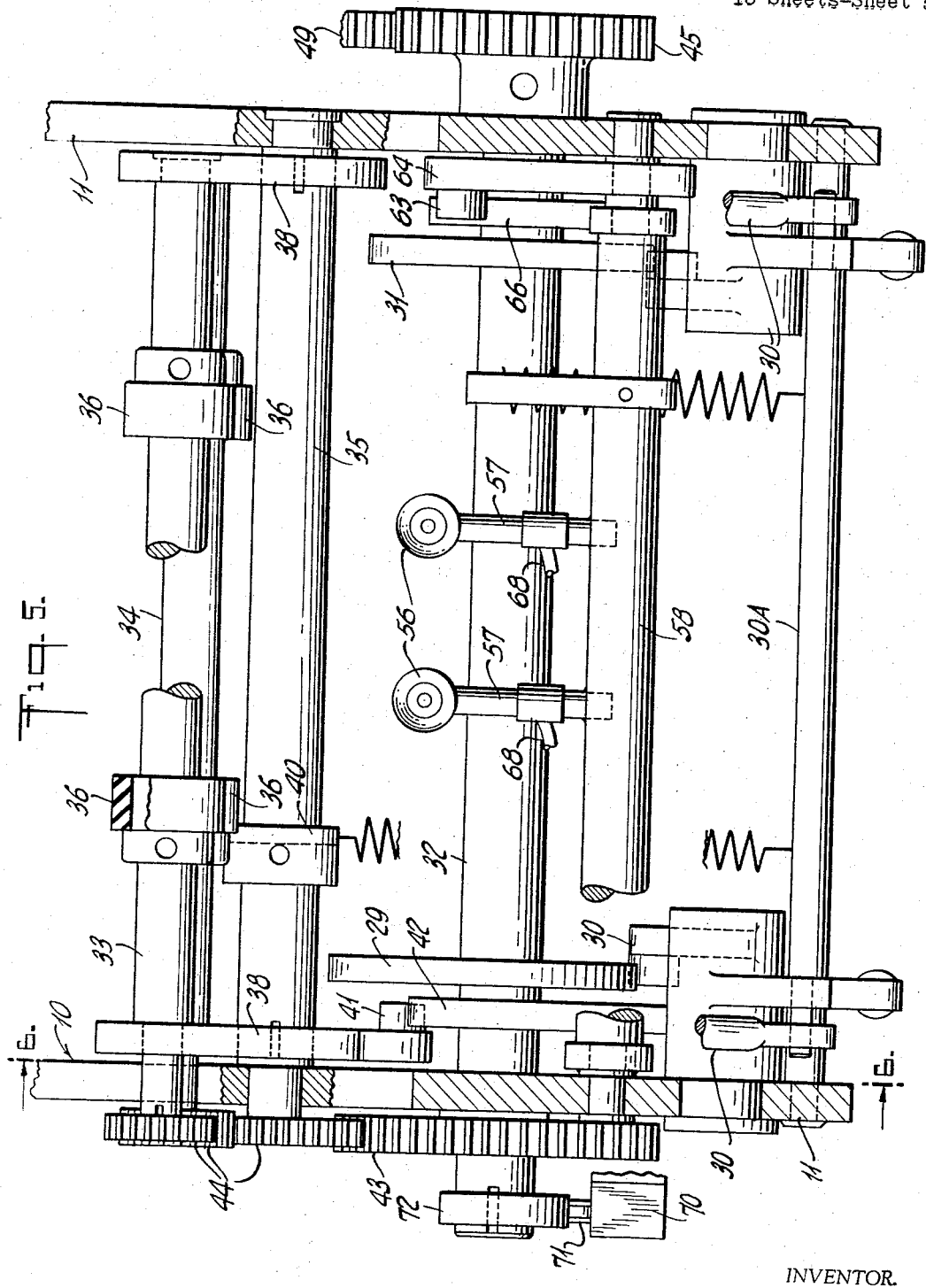
Figure 6:
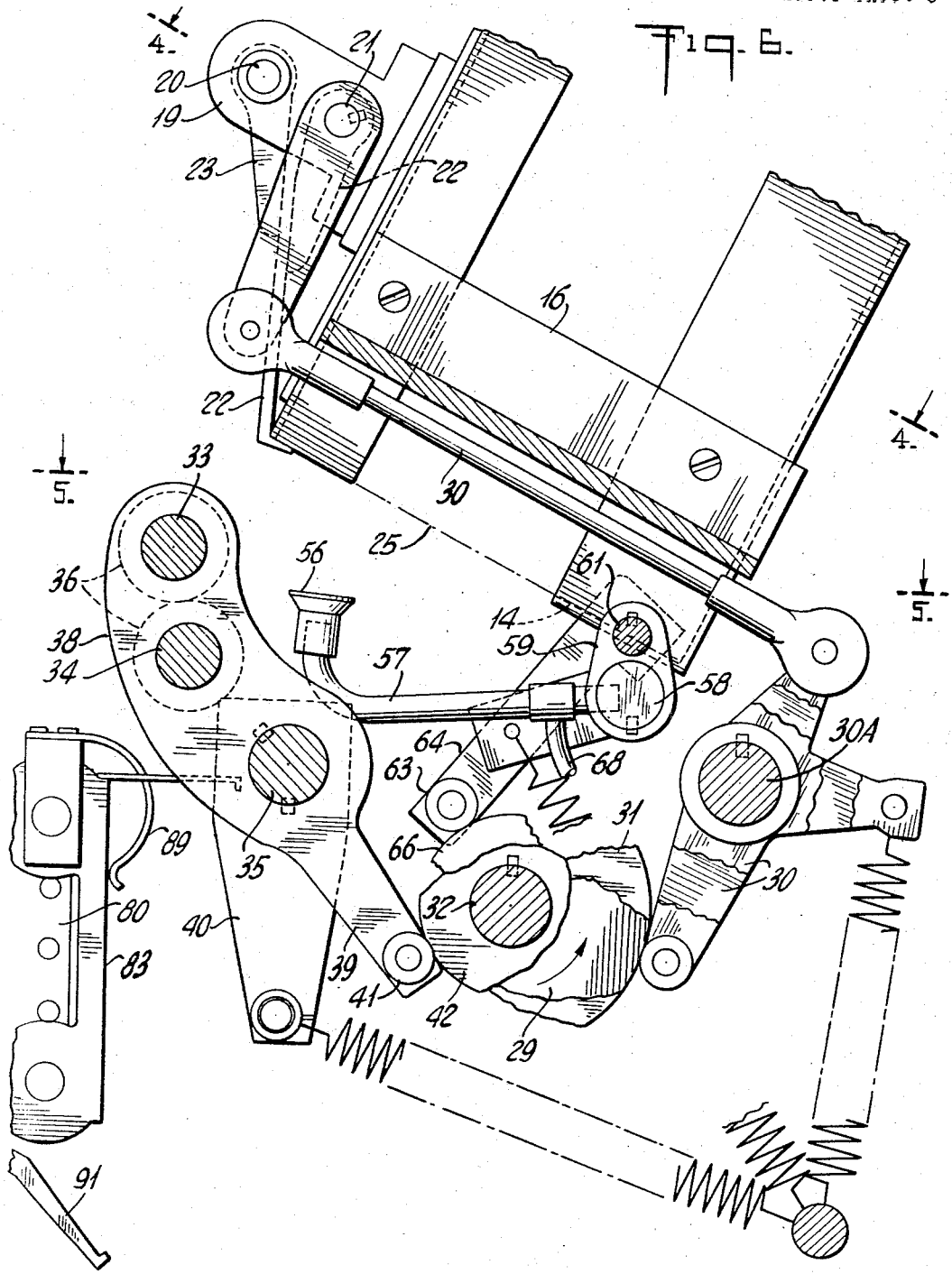
Figure 7:
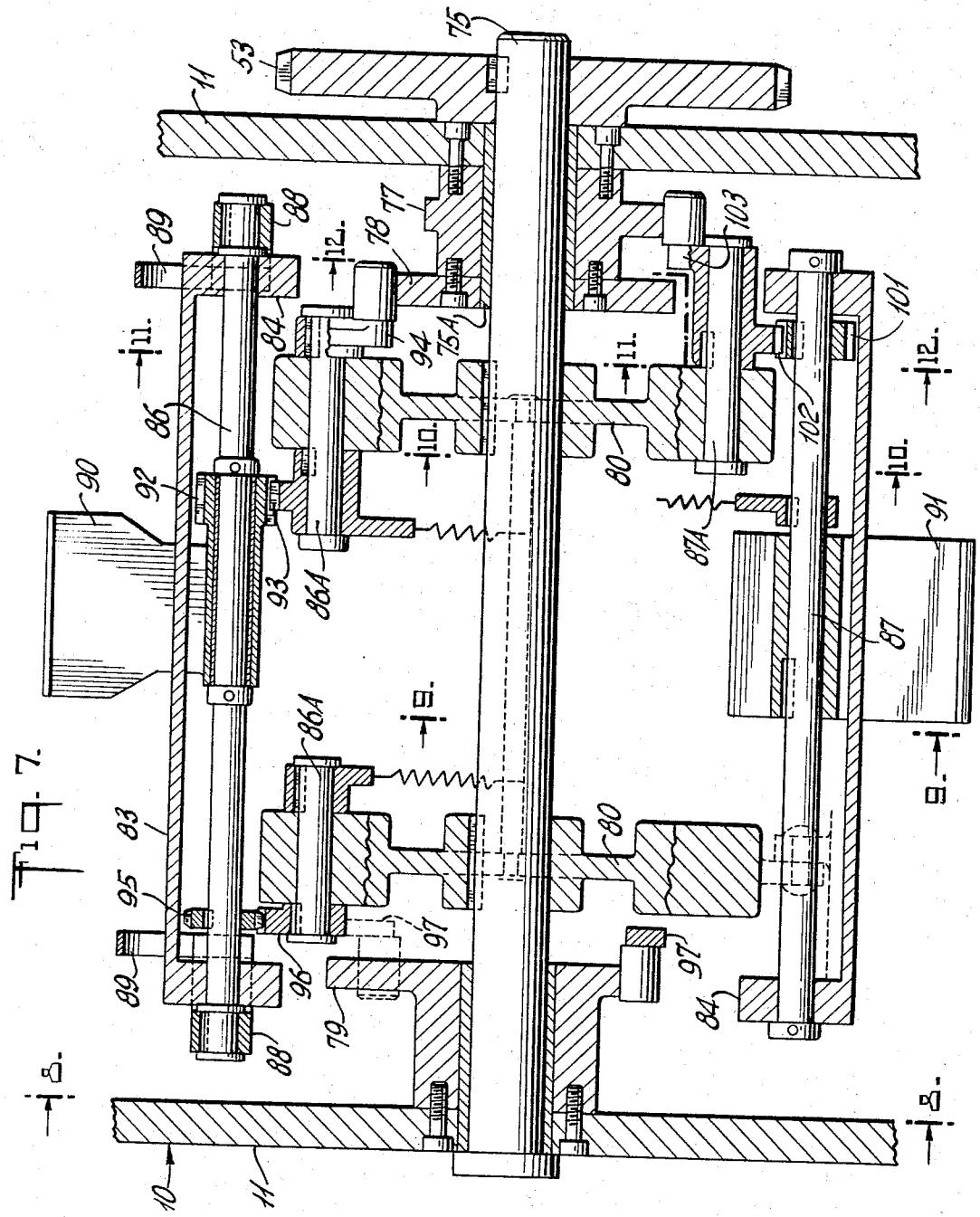
Figure 8:
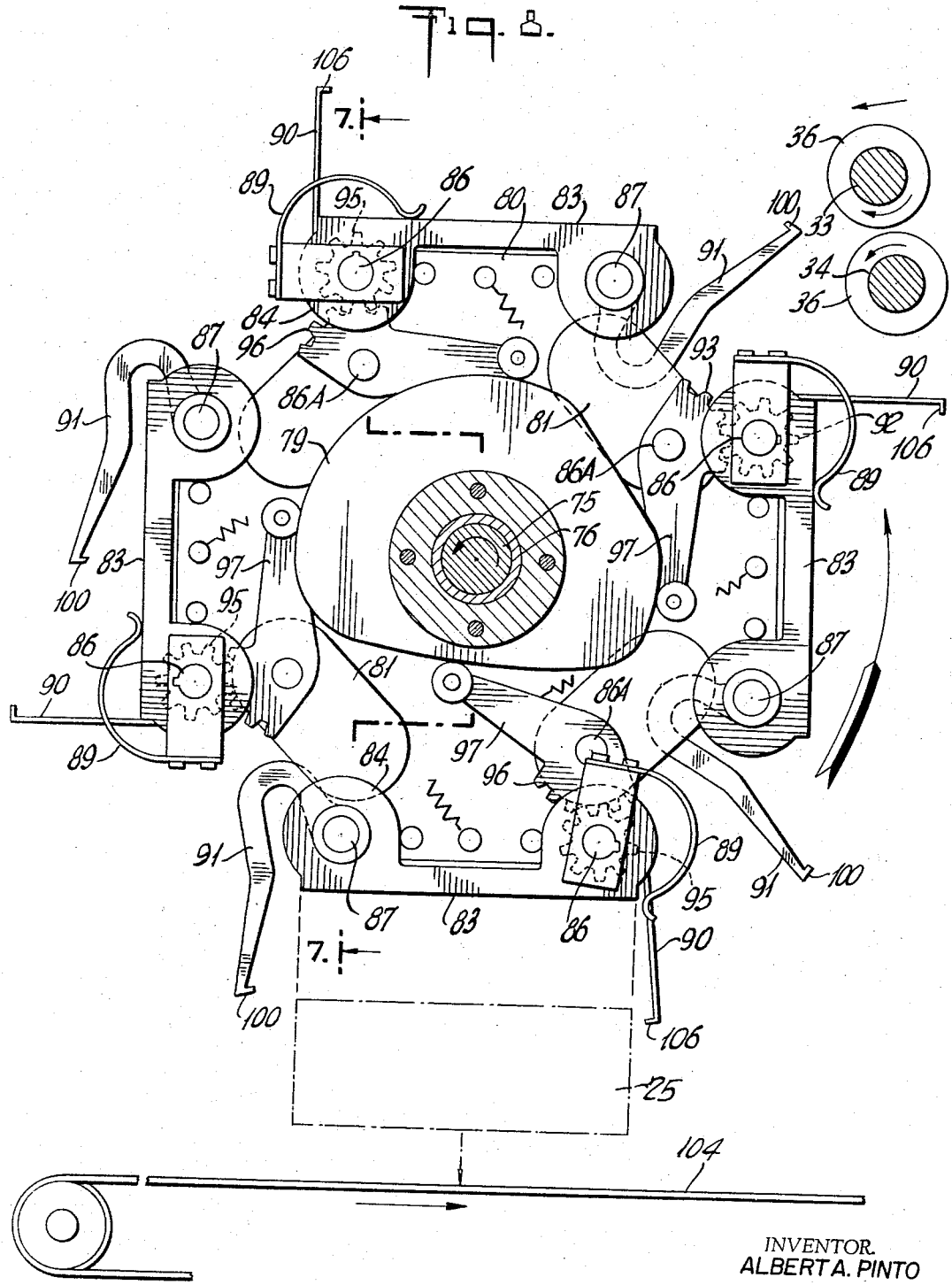
Figure 9:
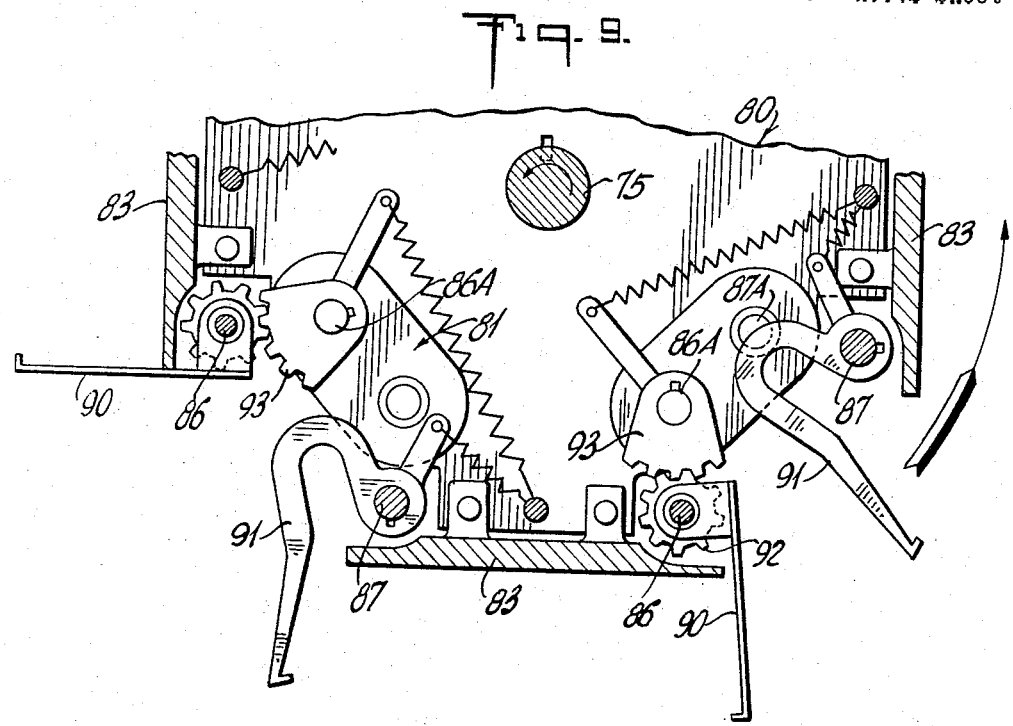
Figure 10:
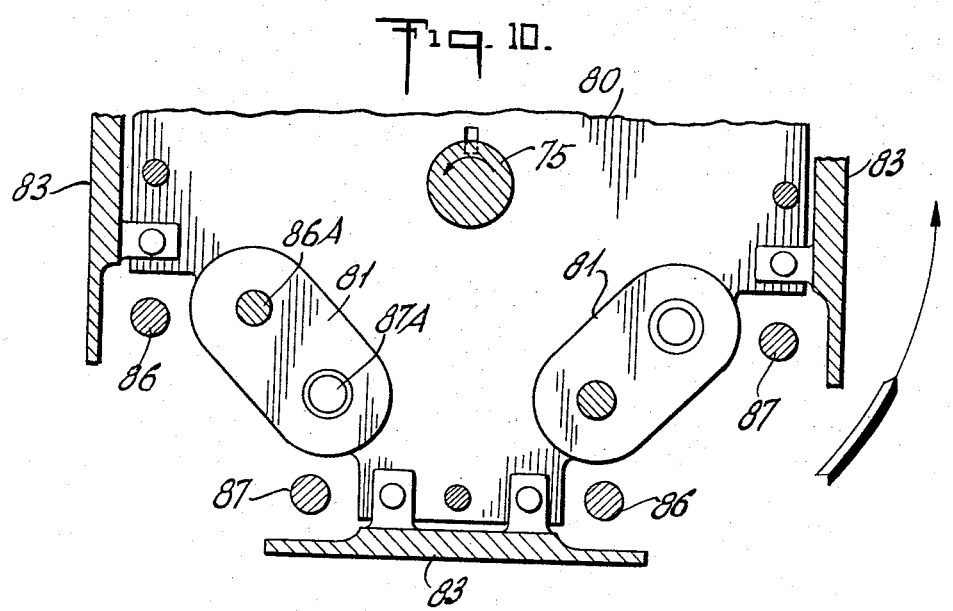

With these and other objects in view, the invention comprises certain constructions hereinafter described and then particularly pointed out in the claims and a preferred embodiment of the invention is illustrated in the accompanying drawings, in which:

FIGURE 1 is a side view of a machine constructed in accordance with the invention and showing the relation of the carton magazine, the carton carrier and erector unit and drive mechanism therefor, FIGURE 2 is a view in perspective, widthwise of the machine, taken substantially on the line 2—2 of FIGURE 1, FIGURE 3 is a view in exploded perspective, widthwise of the machine, taken substantially on the line 3—3 of FIGURE 1 through the carton carrier and erector portion of the machine, FIGURE 4 is a section through the carton magazine, and some of its operating parts, taken on the line 4—4 of FIGURES 1 and 6, FIGURE 5 is a section on the line 5—5 of FIGURES 1 and 6 showing the magazine and some of the carton feeding parts associated therewith, FIGURE 6 is a view in sectional elevation taken substantially along the line 6—6 of FIGURE 2, FIGURE 7 is a view in sectional elevation taken on the line 7—7 of FIGURES 1 and 8, FIGURE 8 is a vertical section showing the carton carrier and erector and taken on the line 8—8 of FIGURE 7, FIGURE 9 is a vertical section taken on the line 9—9 of FIGURE 7, FIGURE 10 is a vertical section taken on the line 10—10 of FIGURE 7, FIGURE 11 is a vertical section taken on the line 11—11 of FIGURE 7, FIGURE 12 is a vertical section taken on the line 12—12 of FIGURE 7, FIGURE 13 is an operational view showing the action of the holding fingers and the suction means in association with the carton magazine, FIGURE 14 is a sectional plan view through FIGURE 13 showing the relative positions of the different pairs of carton holding fingers, FIGURE 15 is a section similar to FIGURE 14 showing the relative positions of the fingers at progressive stages of operation, FIGURE 16 is a section on line 16—16 of FIGURE 15, FIGURE 17 is a section on line 17—17 of FIGURE 15, FIGURE 18 is a section on line 18—18 of FIGURE 15 showing the operation of the section means in cooperation with the fingers, FIGURES 19 through 23 show the progress of a carton from the magazine to the erector section of the machine, and the method employed in initially opening the carton, FIGURE 24 is a fragmentary plan view of one edge of a carton showing how the carton is held on the rotary carrier and erector unit, FIGURES 25 through 29 show the progressive operations of opening or erecting the carton on the carrier unit, and the discharge therefrom to a conveyor, and FIGURE 30 is view in perspective of an erected carton as it is deposited on the conveyor.

Referring to the drawings in detail, 10 indicates the frame of a machine including side plates 11 and suitable cross members 12 to support the interior parts of the mechanism. The frame supports a hopper or magazine 13, extending thereacross, which is composed of upright corner pieces 14 joined by angle brackets 16 or strips 17 fixed to the upper edges of the side plates 11. The corner pieces, at one side of the magazine, FIGURE 4, are extended to provide shelves 18 for the support of a stack of cartons in the magazine. The magazine carries, at the opposite side, brackets 19 forming bearings for shaft 20 and 21 extending across or lengthwise of the magazine and supporting two pairs of spaced fingers 22 and 23, FIGURE 2, whose turned-in lower toe ends 24 underlie and support one side edge of a stack of cartons in the magazine. These fingers are adjustably secured to their respective shafts, which are cam controlled as will be later explained. The cartons are precut, scored and flat folded in rectangular shape and one of the cartons, after it has been erected, is shown in FIGURE 30. Each carton, FIGURES 14, 15 and 30 consists of a scored rectangular blank 25 precut to present top, bottom and side panels 25A, 25B and 25C respectively, side and end flaps 26 and 28, the latter having exposed corner portion 27 at one side of the carton when the carton blank 25 is flat-folded and stacked in the magazine 13. The flaps 28 form a reclosable end and a permanent end closure for the carton 25.

The cartons are withdrawn one at a time from the magazine by suction means and by the releasing action of the pairs of fingers 22 and 23 operated in timed relation by their respective cams 29 and 31, FIGURE 2, through link and cam arm combinations 30 pivoted on counter shaft 30A. The cams 29 and 31 are carried by a shaft 32 which constitutes a drive shaft and extends crosswise of the frame, in which it is journalled. FIGURE 2 is an exploded view showing the parts associated with the magazine, which parts include feed roll shafts 33 and 34 upon which are mounted pairs of feed rolls 36 for cooperative action in feeding the carton after it has been withdrawn from the magazine. The shafts 33 and 34 are carried in rocker plates or arms 37 and 38 the latter of which has a cam extension 39 carrying a roller 41 for engagement with a cam 42 secured to shaft 32. The roller is pressed against the cam by a spring arm 40 and the shaft 32 drives a gear 43 and a gear train 44. One of the gears of the train is free on the shaft 35 and a pair of the gears in the train are keyed to the feed roll shafts 33 and 34. The shaft 35 serves as a pivot shaft about which the rocker plates 37 and 38 may be oscillated by the cam 42 for a purpose to be later described. The rocking motion of the rocker plates does not interfere with the gear driven operation of the feed rolls as the pair of gears, included in the train 44, for operating the shafts 33 and 34 have a planetary motion about the free gear of the train 44. Shaft 32 at its right hand end, FIGURE 2, carries a gear 45 and a sprocket gear 46 whose chain 47 derives its power from a suitable source 48, such as a motor, FIGURE 1. The gear 45, FIGURE 3, drives a gear 49 whose attached spur gear 51, on a stud shaft 52, operates a gear 53 associated with a carton carrying and erecting section 54, of the machine, housed between the side plates 11 of the frame 10.

The removal of the carton blanks 25 from the magazine, FIGURES 13, 16 and 18, is preformed by the synchronous operation of the fingers 22, 23 and suction means including, a pair of spaced suction cups 56, FIGURES 1 and 3, carried on the free ends of pipe arms 57 secured to a rock shaft 58 suspended in links 59 pivoted on suitable stud means 61 mounted in cross members 12. The shaft 58 is biased in one direction through a spring urged arm 62 that holds the roller 63 of a cam arm 64 against a cam 66 on shaft 32. The timing afforded by the cam 66 causes the suction cup means 56 to be forcibly engaged periodically with the under side of the lowermost carton in the magazine 10 so that, when the air in the pipe arms 57 is exhausted by the vacuum pump 67, through the lines 68, the carton is pulled down as shown by the progressive action views in FIGURES 13 through 18. Referring to FIGURES 2 and 6, it will be observed that cam 29, actuating fingers 22, will operate in coactive relation with cam 31 so that the fingers 22 and 23 will be retracted in sequential order to release the cartons in timed relation with the operation of the suction means 56. Control of the vacuum pump 67 through lines 69, FIGURE 2, is accomplished by a regulating switch 70 which in turn is controlled by an arm 71 actuated by a cam 72 on shaft 32.

In FIGURES 1, 3 and 7 to 10 the carton blank carrying and erecting section 54 is shown, along with its operating mechanism, the view in FIGURE 3 being expanded or exploded in parts to more clearly show the control means for handling the carton blank 25. The carrying unit 54 is a little to the left of the magazine 13, FIGURES 1 and 8 and at a lower level so that the carton blanks as they are fed by the feed rolls 36, widthwise, will engage the carrier 54 with a minimum of travel and time. The gear 53 is mounted on and drives a cam shaft 75 which passes through sleeved portions 76 of cams 77, 78 and 79. The sleeved portions 76 are fixed in the side plates 11 provided journals for the shaft 75. The cams 77, 78 and 79 are stationary or fixed cams and control the carton shaping means to be later referred to. The rotary carton carrying means 54 consists of longitudinally spaced cruciform plates or panels 80 shaped to provide peripherally disposed bearing blocks 81 and hub portions 82 the latter of which are keyed to the shaft 75 and revolve in unison with the shaft. The outer edge of each arm portion of each plate 80 has secured thereto a flat metal strip 83 or table or plate upon the outer surface of which a carton 25 is held as the carrier 54 revolves. The carrier 54 comprises the plates 80 and the operating shafts to be described, that are controlled in their operation by the stationary cams, about which the carrier revolves in counter clockwise direction. Each table strip 83 is as wide as the panel 25B of the carton so that when the latter is flat, as seen in FIGURES 21, 22 and 23 it will extend beyond the lengthwise edge of the table strip 83 so that pressure applied at the diagonally opposite corners of the folded carton will cause the same to open up and eventually be pushed into rectangular shape by means to be later referred to but shown in FIGURES 25, 26 and 27. Each table strip 83 at its end corners, FIGURES 3 and 8, is shaped to provide a depending ear 84 which constitutes a bearing for the shafts 86 and 87, the shafts 86 being extended beyond the ends of the plates 83 to carry a finger arm 88 to which is attached a spring clip 89 for engagement with the top of the respective table strip 83 to hold a carton blank securely on the table by engagement with the exposed corner portions 27 of said carton blank.

For each plate or table 83 there is provided two spring clips 89, a carton detent blade or paddle 90 and a carton opening or forming paddle or blade 91. The paddle 90 is revolvably mounted on shaft 86 and includes a gear 92 for operation by a gear segment 93 fixed to a shaft 86A, which is oscillated by a cam arm 94 as the latter moves around the cam 78. The shaft 86 is oscillated independently of paddle 90 by a gear 95 fixed to said shaft and oscillated in turn by a year segment 96 forming part of a cam arm 97 that rotates about the cam 79 to open and close the spring clips 89 in synchronism with the operation of the coacting paddles or blades 90 and 91. The paddle or blade 91 is shaped to provide a retrorse section 98 and an extended portion 99 terminating in a carton engaging foot or ledge 100 and is fixed to the shaft 87 journalled in ears 84. The shaft 87 has secured thereto a gear 101 which is oscillated by the gear segment portion 102 of a cam arm 103 which rotates about the cam 77, the cam arm 103 being secured to a counter-shaft 87A, suitably supported in the plates 80. It is evident that the carton carrier or erecting section 54 rotates on shaft 75 about the cams 77, 78 and 79 which are held stationary in the side plates 11 so that as the carton blanks come out of the magazine they are deposited on the table plates 83, held there by the clips 89 and during rotation of the carrier are opened and discharged on to a suitable conveyor 104 ready to encase packets of crackers or the like.

In the FIGURES 13 to 23 the operation of the mechanism is illustrated in step by step form and when the suction cups 56 are forced against the under side of the lowermost carton blank 25 in the magazine, the vacuum created by the pump 67 will cause the carton to adhere to the cups which draw the center portion of the carton down as the inner pair of fingers 23 are withdrawn, FIGURE 18, after which replacement of the fingers 23 occurs to hold the stack in place as the outer fingers 22 are withdrawn. As the suction cups 56 withdraw the carton blank, they are moved in a pivotal motion downwardly and obliquely, by action of the cam 66, to lead the edge of the carton to the bite of the feed rolls 36 which are being moved to meet the oncoming carton blank, by the cam 42 and their rocker plates 37 and 38. When the carton passes or is fed by the feed rolls 36 its leading edge, FIGURE 21, corners at the junction formed by the table strip 83 and the carton detent blade 90. The infeed speed of the carton is such that the leading edge thereof is held in place as the carrier rotates in counter-clockwise direction and lateral pressure on the carton, due to the speed of the feed rolls, will open the carton blank slightly as shown in FIGURE 22 and it will be secured in place on the table 83 thereafter by the clips 89, engaging the exposed corner portions 27 thereof. The instant that the clips 89 engage the carton the feed rolls will have a forward movement and the carton will be forced into contact with the table by the clips as seen in FIGURE 23. Then the carton will be engaged at its diagonally opposite edge by the carton opening blade 91, whose foot or ledge 100 will exert lateral pressure on the edge of the carton which overhangs the side edge of the table as seen in FIGURE 25. The operation of the feed rolls, suction means, clips, paddle 90 and opening blade 91 is all coordinated for synchronous operation to carry out the opening and discharge of the carton.

The continued pressure of the blade 91 on the edge of the carton will force it, against the resistance provided by paddle 90, to a fully open or rectangular form as shown in FIGURE 26. The continued operation of the blade 91 will give the carton a reverse bending pressure against the resistance afforded by a ledge 106 on the edge of blade 90, as seen in FIGURE 27, this being accomplished by the shape of the blade 91 in its extended portion which is reversely bent to provide a pocket or seat 105 against which the edge of the carton bears. The blade or paddle 90 has a retract movement to permit the carton to be given the reverse fold so that it will move back into and hold a rectangular shape when the members 90 and 91 assume a position substantially at right angle to the table strip 83, as shown in FIGURE 28. When the table is upside down as shown in FIGURE 29 the members 90 and 91 will open or retract and the two spring clips 89 will release the carton and allow the carton in open form to drop out on the conveyor 104. Thus a continuous high speed operation is provided which feeds the cartons to the carrier, opens them while they are being fed and then drops them to position on a conveyor, ready to be filled.

It is evident that a compact machine unit of this character reduces the travel time of the cartons during the shaping operation which contributes to high speed packing operations with a minimum of attendance and space required.

The invention is not to be restricted to the precise details of construction shown since various changes and modifications may be made therein without departing from the scope of the invention or sacrificing the advantages to be derived from its use.

What is claimed is:

1. A machine for setting up prefolded cartons in rectangular form comprising, in combination, a magazine in which said cartons are stacked flat, means for withdrawing single cartons from the bottom of the stack, rotary carton feeding means presenting a plurality of table faces, means for feeding the withdrawn cartons singly to each of said table faces in succession, said cartons each presenting exposed corner portions, clip means on the rotary feeding means for engagement with said exposed corner portions to secure the cartons to their respective table faces, detent blade means at one edge of each table face, carton opening blade means at one edge of each table face and opposite said detent blade means, and cam controlled means for each of said clip means, detent blade means and carton opening blade means for controlling the operation thereof in synchronism for erecting the cartons, reversely folding the same after initial erection, and releasing the set-up cartons, respectively from the carton feeding means during the rotation thereof.

2. A machine for setting up prefolded cartons in rectangular form comprising, in combination, a magazine in which said cartons are stacked flat, means for withdrawing single cartons from the bottom of the stack, rotary carton carrier means, detent means on said carrier, feed roll means for advancing the withdrawn cartons to the rotary means, said feed roll means and detent means coacting to produce an initial opening of the carton, movable means on said carrier controlled by the rotary operation of said carrier for fully opening the cartons to rectangularly erect position and releasing the same from the carrier means.

3. A machine for setting up prefolded cartons in rectangular form comprising, in combination, a magazine in which said cartons are stacked flat, means for withdrawing the cartons one at a time from the bottom of the stack, a rotary carton carrier means presenting table areas means for feeding the cartons successively to each table area, said rotary carrier means including a drive shaft, stationary cams having sleeve portions secured in the frame of the machine and providing journals for said shaft, detent blade means mounted at one side of each table area, a carton opening blade means mounted at one side of each table area and opposite said detent blade means, and means associated with said detent blade means and with said carton opening blade means for engagement with said stationary cams for actuating the blade means during rotation of said carton carrier means, for erecting the cartons on said table areas and discharging the same therefrom.

4. The combination of claim 2, wherein the rotary speed of the carton carrier is less than the carton feeding speed of the feed roll means whereby the carton, in engagement with the detent means, is subjected to opening pressure by the feed roll means to produce said initial opening of said carton.

5. The combination of claim 2, wherein clips are mounted on said carton carrier, means for opening and closing said clips to release and hold the carton respectively on the carrier means, and means for causing said clips to engage the carton and force them into contact with the carrier as the latter moves beyond the carton feeding range of said feed rolls.

6. The combination of claim 2, wherein the movable carton opening means includes a carton opening blade mounted for pivotal movement at one edge of the carrier and presenting a ledge along its free edge for hooking engagement with the edge of a carton being opened and coacting with the detent means to hold the fully opened carton on the carrier.

7. The combination of claim 2, wherein the movable carton opening means includes a carton opening blade mounted for pivotal movement at one side of said carrier and shaped to provide an extended portion defining a pocket for coactive operation with the extended portion in pushing a carton to open position, and a ledge on the free edge of said blade for hooking and holding engagement with a carton being opened and in fully erected form.

8. The combination of claim 7, wherein the extended portion and the pocket portion of said carton opening blade coact, upon one pivotal movement of said blade, to fully open the carton and thereafter give it a further opening and overfold movement whereby it will hold a rectangularly erect position when discharged from said carrier.

9. The combination of claim 2, wherein the rotary carton carrier means includes a plurality of table means on which the cartons are deposited in flat form one at a time, said table means having depending journal portions, shafts for operating said movable carton means journalled in said journal portions, stationary cam means in the carrier and means operated by said cam means for controlling the synchronous operations of said shafts.

10. A machine for setting up prefolded cartons in rectangular form comprising, in combination, a magazine in which said cartons are stacked flat, corner means in the magazine for supporting the carton stack at one edge, stack supporting finger means having toe portions for supporting the stack by engagement with the opposite edge thereof, said finger means being arranged in spaced pairs, means for withdrawing single cartons from the bottom of the stack, movable shafts from which said finger means are suspended, means for moving each of said pairs into and out of stack supporting position, said moving means being coordinated in operation for moving one pair successively out of and into stack supporting position during an initial action of said carton withdrawing means and back into stack supporting position after the final withdrawing action of said carton withdrawing means, rotary carton carrying means, means for feeding the withdrawn cartons to said rotary means, movable carton engaging means on said carrier controlled by the rotary operation of said carrier for opening the cartons to rectangularly erect position and releasing said opened cartons from the carrying means.

11. A machine for setting up prefolded cartons in rectangular form comprising, in combination, a magazine in which said cartons are stacked flat, movable means for supporting the stack in said magazine, means for withdrawing single cartons from the bottom of the stack, rotary carton carrying means, means for feeding the withdrawn cartons to said rotary means, movable carton engaging means on said carrier, said rotary carton carrying means including a shaft, driving means for said shaft, sleeved cam means providing journals for said shaft and fixed in the frame of the machine, plate means fixed to said shaft for rotation therewith, flat strips fixed to the outer edges of said plate means and constituting carton supporting table means at each side of said plate means, said sleeved cam means controlling the operation of said movable carton engaging means during rotation of said carrying means, and said movable carton engaging means on said carrier being controlled by the rotary operation of said carrier for opening the cartons to rectangularly erect position and releasing said opened cartons from the carrying means.

12. A machine for setting up prefolded cartons in rectangular form comprising, in combination, a magazine in which said cartons are stacked flat, movable means for supporting the stack in said magazine, means for withdrawing single cartons from the bottom of the stack, rotary carton carrying means, means for feeding the withdrawn cartons to said rotary means including a rotatable cam shaft, a cam on said shaft, pairs of spaced feed rolls in alignment with said magazine and said carton withdrawing means, rocker plate means, feed roll carrying shafts carried by said rocker plate means, cam engaging means on said rocker plate means for moving the feed rolls toward and away from said carton withdrawing means for feeding a carton to said carrier and movable carton engaging means on said carrier controlled by the rotary operation of said carrier for opening the cartons to rectangularly erect position and releasing said opened cartons from the carrying means.

13. A machine for setting up prefolded cartons in a rectangular form comprising, in combination, a magazine in which said cartons are stacked flat, movable means for supporting the stack in said magazine, means for withdrawing single cartons from the bottom of the stack, rotary carton carrying means, means for feeding the withdrawn cartons to said rotary means, movable carton engaging means on said carrier controlled by the rotary operation of said carrier for opening the cartons to rectangularly erect position and releasing said opened cartons from the carrying means, said movable carton engaging means being pivoted on said carrier and including carton detent blade means at one side of the carrier, carton opening blade means at the opposite side of said carrier, means for advancing and retracting the carton detent blade means toward and away from the carrier, means for advancing and retracting the carton opening blade means toward and away from the carrier, said carton opening blade means being adapted to force said carton to open rectangular position as it moves toward the carrier, and said carton detent blade means in advanced position abutting one side of the carton during the advancing movement of said carton opening blade means.

14. A machine for setting up prefolded cartons comprising, in combination, a magazine in which said cartons are stacked flat, means in the magazine for supporting one edge of the carton stack, movable means for releasably supporting the opposite edge of the carton stack, suction means for withdrawing single cartons from the bottom of the stack, means for coordinating the action of said movable releasing and suction means, rotary carton carrying means presenting a plurality of table faces, means for feeding the withdrawn cartons singly to each table face, means controlled by the rotary operation of said carrying means for opening the cartons to rectangularly erect position and releasing said cartons from said table faces, said means for opening the cartons including carton holding clips, a carton detent blade and a carton opening blade, said detent blade and opening blade being disposed at opposite edges of each table face, a plurality of shafts associated with each table face, gear means on said shafts for operating said clips, said carton detent blade and said opening blade, segmental gear means in mesh with said shaft gear means, a shaft for supporting said rotary carton carrying means, stationary cams on said shaft, and means on said segmental gear means operated by said stationary cams for controlling the operation of said clips, the detent blade and the carton opening blade of each table face for progressively shaping each carton and discharging the same from said carrying means.

References Cited by the Examiner
UNITED STATES PATENTS

| | | | |
|---|---|---|---|
| 2,765,715 | 10/1956 | Kerr | 93—53 |
| 2,914,323 | 11/1959 | Sramek | 271—32 |
| 2,984,162 | 5/1961 | Gordon | 93—53 |
| 3,122,071 | 2/1964 | Vogel | 93—53 |
| 3,242,827 | 3/1966 | Winters | 93—53 |

FOREIGN PATENTS 475,616   4/1929   Germany.

BERNARD STICKNEY, *Primary Examiner.*